US006935359B2

(12) United States Patent
Fernandez

(10) Patent No.: US 6,935,359 B2
(45) Date of Patent: Aug. 30, 2005

(54) DIGITAL PRESSURIZATION COMPOUND TERMINAL

(76) Inventor: Manuel Roland Fernandez, 12418 Baywind Ct., Boca Raton, FL (US) 33428

(*) Notice: Subject to any disclaimer, the term of this patent is extended or adjusted under 35 U.S.C. 154(b) by 321 days.

(21) Appl. No.: 10/164,157

(22) Filed: Jun. 6, 2002

(65) Prior Publication Data

US 2002/0185177 A1 Dec. 12, 2002

Related U.S. Application Data

(60) Provisional application No. 60/296,265, filed on Jun. 6, 2001.

(51) Int. Cl.[7] .......................... F16K 15/20; F16K 37/00

(52) U.S. Cl. .................. 137/228; 137/505.25; 137/557; 137/596

(58) Field of Search ............................ 137/228, 505.25, 137/557, 596; 141/95

(56) References Cited

U.S. PATENT DOCUMENTS 1,369,555 A * 2/1921 Schweinert et al. ........ 137/228
1,444,188 A * 2/1923 Key ........................... 137/228
1,781,121 A * 11/1930 Mcfarland .................. 137/228
1,786,103 A * 12/1930 Partridge et al. ........... 137/228
2,592,759 A * 4/1952 Sullivan ...................... 141/95
4,998,438 A * 3/1991 Martin ........................ 137/228
5,529,096 A * 6/1996 Rowe et al. .................. 141/95
5,906,227 A * 5/1999 Sowry ......................... 141/95
6,234,221 B1 * 5/2001 Clark, II ...................... 141/95
6,360,790 B1 * 3/2002 Klamm et al. ................ 141/95

* cited by examiner

*Primary Examiner*—John Rivell
(74) *Attorney, Agent, or Firm*—David P. Lhota; Stearns Weaver Miller; Weissler Alhadeff & Sitterson, P.A.

(57) ABSTRACT

A digital pressurization compound terminal 10 comprising a high accuracy digital pressure gauge 11 sheltered in a silicon housing, main body 13 made of a high-resistance allow and dimensioned to be held in the palm of the user's hand, o-ring 12, control or HP valves 14, ring 15, regulator assembly valve 16, equipped piston 17, second o-ring 18, inferior body and handle 19, third o-ring 20, male quick coupling 21, screw 22, regulator setting wheel 23, purging female quick coupling 24, service female quik coupling 25 and on-off switch 26.

3 Claims, 2 Drawing Sheets

DIGITAL PRESSURIZATION COMPOUND TERMINAL

CROSS REFERENCE TO RELATED APPLICATIONS

This application claims the benefit of Provisional Application Ser. No. 60/296,265 filed Jun. 6, 2001.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to pressurization equipment, and more particularly, to a digital pressurization compound terminal for filling, purging and pressurizing fluids, such as hydraulic fluid, in aircraft, helicopter, automobile, military, agricultural, space and marine industries.

2. Description of the Background Art

Traditional pressurization equipment comprises analog and digital gauges are only adapted for use in inflating tires. In addition, they are limited to a maximum pressure of 30 BAR. Moreover, conventional pressurization equipment can only convey gas, and surplus gas is always expelled outside.

The prior art reveals control valves that are used in inflating, deflating and filling operations. Existing equipment consists of a body equipped with two valves. The first valve is a distribution valve, which distributes a liquid or a gas. The second valve is a draining valve, which controls the purge system. This body also has four connectors. A hose is connected to the first connector for the incoming pressurized hydraulic fluid or azote. Another hose is connected to the second connector and connects to the equipment to be inflated or filled. A pressure gauge is connected to the third connector and controls the pressure to be put in the equipment. Lastly, a purging hose is connected to the fourth connector and allows the surplus liquid or emulsified fluid to flow out and drop either on the floor or in an appropriate drain container.

Existing pressurization equipment, as noted above, is cumbersome. It consists of a rectangular or hexagonal body, on the perimeter of which various hoses and a pressure gauge are connected. Therefore, when the user is moving the unit around, the non-rotating connections get loose, often provoking leaks. This results in the pressure indications becoming distorted, forcing the user to tighten all the connections again, before resuming the task.

There are no known devices in the prior art that address the shortcomings in the prior art in a single unit. In addition, multiple pieces of equipment are required for fluid filling, purging and pressurizing operations and are limited in pressure capacity. Pressurization equipment addressing the foregoing would be well received. The instant invention addresses this gap in the prior art.

BRIEF SUMMARY OF THE INVENTION

Based on the foregoing, it is a primary object of the instant invention to provide versatile pressurization equipment that performs fluid filling, purging and pressurization in a single unit.

It is another object of the instant invention to provide pressurization equipment that can perform fluid filling, purging and pressurization operations in a range of −14 PSI to 6,300 PSI (450 BAR).

It is also an object of the instant invention to provide pressurization equipment in a single unit that can perform the fluid filling, purging and pressurization operations of seven gauges and seven connectors.

It is an additional object of the instant invention to provide pressurization equipment that is durable and highly accurate.

It is another object of the instant invention to provide pressurization equipment that can convey gas and fluids.

In light of these and other objects, the instant invention provides a digital pressurization compound terminal that performs the function of a plurality of gauges and connectors in a single unit. The digital pressurization compound terminal comprises a single unitary piece of equipment that is used in filling, purging and pressurization operations up to 6400 PSI or 450 BAR. The digital pressurization compound terminal replaces, with an increased performance, the traditional control valves known in the prior art and described infra. The digital pressurization compound terminal has a digital pressure gauge that can gauge both high and low pressures within a range of −15 PSI to 6300 PSI, or between −1 and 450 BAR, and replaces seven (7) analog pressure gauges as well as seven (7) pressure gauge connectors. The digital pressurization compound terminal can convey gas and fluids. It is compatible with hydraulic fluids used in aircraft equipment, helicopters, cars, military, agricultural, space and marine industries.

The digital pressurization compound terminal is hand held and ergonomically designed equipment, comprising a main body made in a high-resistance alloy and a high-accuracy digital pressure gauge sheltered in a thick anti-shock silicone shell. The digital pressurization compound terminal has a purge system which allows the fluids or the emulsified gas to be easily released and properly collected in a drain container. With the design of the digital pressurization compound terminal, the filling, pressurization, and purge operations are made easier, cleaner and faster for the user. In addition, a filtering cartridge is installed in the digital pressurization compound terminal's main body interior system to filter the fluid so it is not polluted before penetrating the system being maintained.

In accordance with these and other objects, which will become apparent hereinafter, the instant invention will now be described with particular reference to the accompanying drawings.

DETAILED DESCRIPTION OF THE INVENTION

Figure 2:
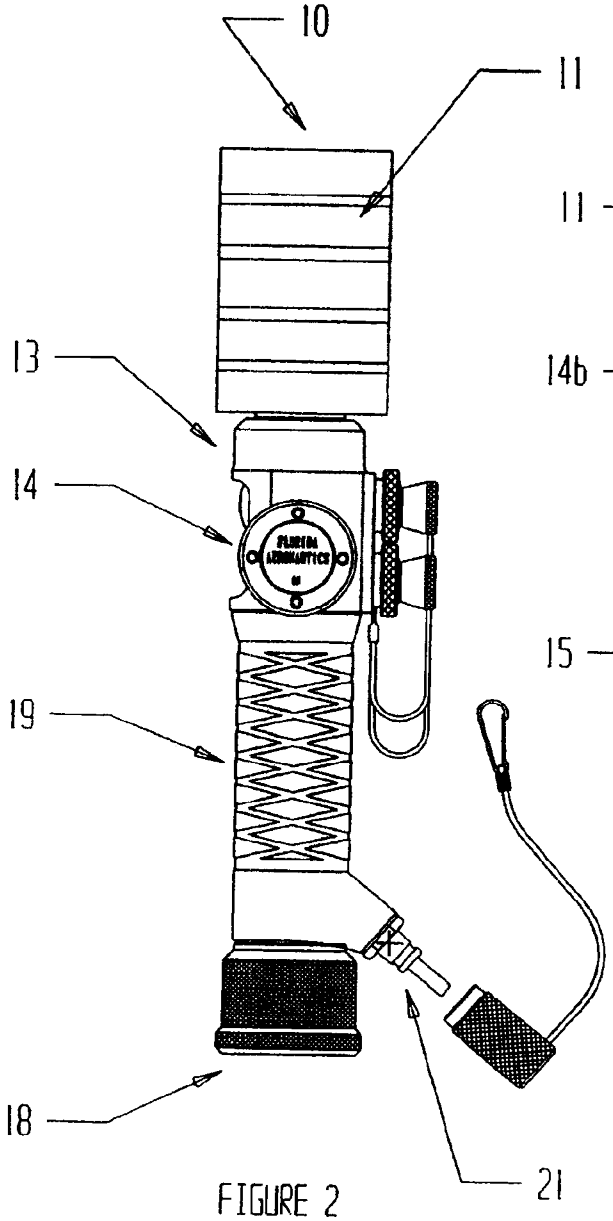
FIG. 2 is a side view of the preferred embodiment of the digital pressurization compound terminal of the instant invention.
Figure 1:
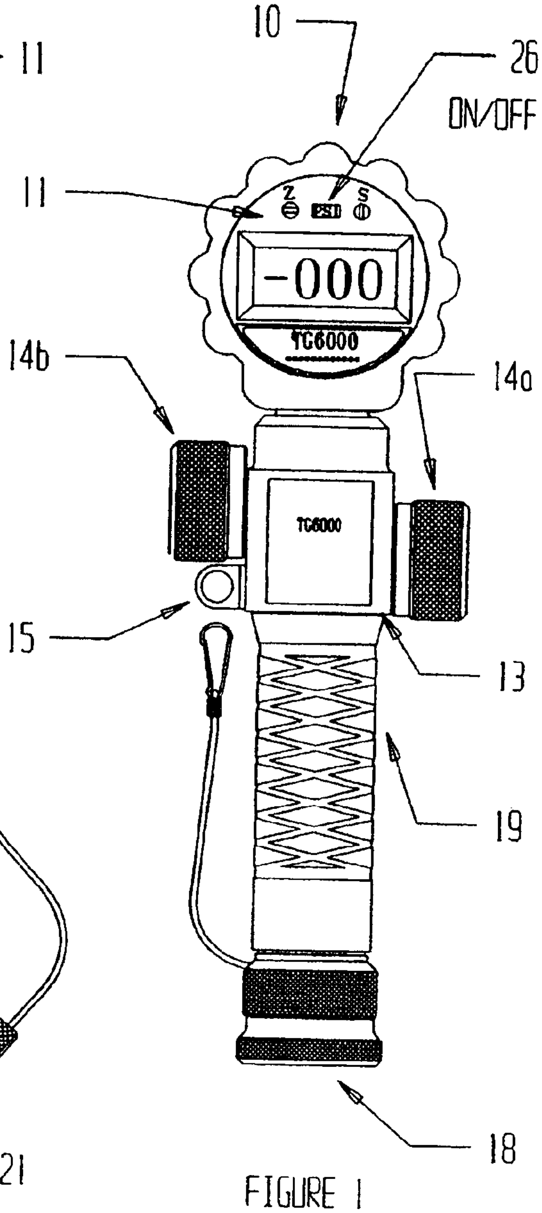
FIG. 1 is a front elevational view of the preferred embodiment of the digital pressurization compound terminal of the instant invention.
Figure 3:
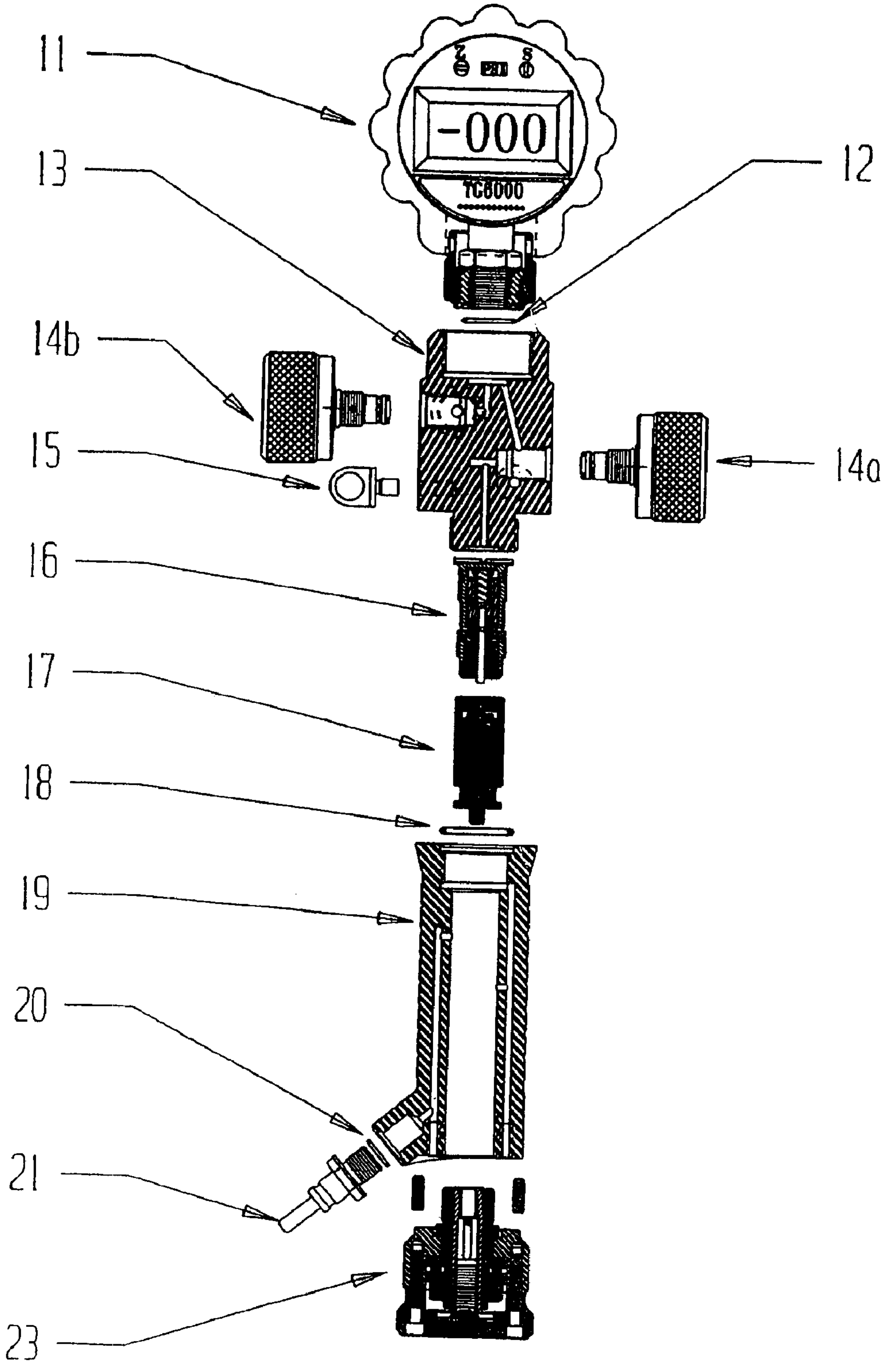
FIG. 3 is an exploded cross-sectional view of the digital pressurization compound terminal of the instant invention illustrating a digital pressure gauge sheltered with silicone protection 11 at the upper end, a purge outlet port 14 in the middle, an inflating and filling outlet port 14, and a handle with a filtering cartridge therein.

With reference to the drawings, FIGS. 1–3 depict the preferred and alternative embodiments of the instant invention which is generally referenced as a digital pressurization compound terminal and, or by reference numeral 10. Referring to FIG. 1, the instant invention 10 comprises a digital pressurization compound terminal 10 made in one piece and preferably has overall dimensions of 290 mm long, 87 mm wide and 74 mm thick. These dimensions may vary provided performance is not jeopardized. The digital pressurization compound terminal 10 is compact and has an ergonomically designed handle 19 that facilitates convenient holding and handling. The instant invention 10 may also include a carrying case having foam compartments for securing and protecting the device 10. The digital pressurization compound terminal 10 regulates pressure, has a negative and positive pressure range from −15 PSI to 6300 PSI, can be used with Nitrogen gas and has a control valve 14 to complete a pressurization operation. The The digital pressurization compound terminal 10 comprises a high accuracy digital pressure gauge 11 sheltered in a silicon housing, main body 13 made of a high-resistance allow and dimensioned to be held in the palm of the user's hand, o-ring 12, control or HP valves 14*a–b*, ring 15, regulator assembly valve 16, equipped piston 17, second o-ring 18, inferior body and handle 19, third o-ring 20, male quick coupling 21, screw 22, regulator setting wheel 23, purging female quick coupling 24, service female quik coupling 25 and on-off switch 26. The handle 19 is cylindrically shaped and has a fine filter cartridge in its cylinder. This cartridge is equipped at the lower end part of an inlet port (with a male thread), on which is connected a hose for the incoming hydraulic fluid or pressurized azote. The base of the handle 19 is equipped with a regulator steering wheel 23 and the male-in quick coupling 21, which receives the hose alimentation in nitrogen or hydraulic fluid. The regulator steering wheel 23 adjusts pressure in service. On the other part of the handle 19, a carter holds two valves. The first valve, a valve-in 14*a*, is located on the right side of the device 10 and controls distribution of the nitrogen or fluid towards the equipment being inflated or filled. The second valve, valve-out 14*b*, is situated on the opposite side and precisely depressurizes or purges the equipment currently in use. Two quick coupling orifices are positioned on the back side of the upper part of the carter body and equipped with caps. The purging female quick coupling and orifice 24 on the upper right connects the purging hose (3281-000) equipped with a check valve. The purging female quick coupling and orifice 25 on the lower left connects the HP NATO hose (3300-000, 3160-400 or 3160-900) fitted to depressurize or fill up the equipment. The diameter of each hole is different to prevent wrong connections. On the upper part of the valve carter 13, the digital pressure gauge 11 of high precision can be set in PSI or BAR and is installed with an anti-chock protector in largely dimensioned silicone.

The cubically shaped central part or carter body 13 has two valves. The first valve 14*a* distributes the gas or the hydraulic fluid, towards either the digital pressure gauge 11, or the outlet connector, equipped with a NATO standard male port. On this connector, a high-pressure hose connects the digital pressurization compound terminal to the equipment to be pressurized, such as an aircraft. This hose can be used for both draining and filling operations. The second valve 14*b* finishes with a connector located at the back of the equipment. This valve is used to purge the system. It carries the oil or gas surplus to the drain container.

A high-accuracy digital pressure gauge 11, which can measure any pressure from −15 to 6300 PSI or from −1 to 450 BAR, is installed on the upper part of the digital pressurization compound terminal 10. A shock absorbent silicone protection covers the back and the side of the gauge. The front of the gauge 11 is uncovered and displays the digital panel.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A digital pressurization compound terminal device, said device comprising:

a handle having an upper end and a lower end;

a regulator setting wheel installed on said lower end of said handle for regulating pressure;

a carter body installed on the upper end of said handle, said carter body having a first valve for controlling the distribution of a working gas or fluid toward the equipment being serviced and a second valve for depressurizing the equipment;

a first quick coupling orifice for connecting a purging hose having a check valve;

a second quick coupling orifice for connecting a hose that is used for depressurizing and filling up the equipment; and a digital pressure gauge mounted to the top end of the carter body.

2. A device as recited in claim 1, further comprising a regulator assembly valve and piston disposed inside said handle.

3. A device as recited in claim 1, further comprising a quick male coupling for connecting a hose used for receiving incoming fluid or gas.

* * * * *